(12) United States Patent
Sugawara et al.

(10) Patent No.: US 8,027,313 B2
(45) Date of Patent: Sep. 27, 2011

(54) WIRELESS COMMUNICATION DEVICE AND METHOD OF RESTRAINING DISPERSION OF PROPAGATION ENVIRONMENT INDEX

(75) Inventors: Youji Sugawara, Kawasaki (JP); Koji Matsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 12/222,128

(22) Filed: Aug. 4, 2008

(65) Prior Publication Data

US 2009/0082030 A1   Mar. 26, 2009

(30) Foreign Application Priority Data

Sep. 20, 2007   (JP) .................................. 2007-243849

(51) Int. Cl.
*H04W 4/00*   (2009.01)
(52) U.S. Cl. ........ 370/332; 370/333; 370/335; 370/338; 370/342; 455/450; 455/452.1; 455/550.1; 455/525
(58) Field of Classification Search ....... 455/450–452.1, 455/550.1, 23, 525; 370/332–333, 335, 328, 370/338, 342
See application file for complete search history.

(56) References Cited

U.S. PATENT DOCUMENTS

| | | | | |
|---|---|---|---|---|
| 5,642,353 A * | 6/1997 | Roy et al. | ...................... | 370/329 |
| 6,366,601 B1 * | 4/2002 | Ghosh et al. | ................... | 375/130 |
| 6,631,127 B1 * | 10/2003 | Ahmed et al. | ................ | 370/349 |
| 6,738,370 B2 * | 5/2004 | Ostman | ......................... | 370/349 |
| 7,131,049 B2 * | 10/2006 | Kim et al. | ..................... | 714/751 |
| 7,363,007 B2 * | 4/2008 | Hanaoka et al. | ................ | 455/44 |
| 7,388,919 B2 * | 6/2008 | Varma et al. | .................... | 375/259 |
| 7,403,545 B2 * | 7/2008 | Sato | .............................. | 370/503 |
| 7,515,877 B2 * | 4/2009 | Chen et al. | ..................... | 455/69 |
| 2002/0003798 A1 * | 1/2002 | Sato et al. | ..................... | 370/390 |
| 2003/0123598 A1 * | 7/2003 | Gollamudi et al. | ........... | 375/377 |
| 2003/0137950 A1 * | 7/2003 | Kim et al. | ..................... | 370/318 |
| 2005/0053038 A1 * | 3/2005 | Kimura | ......................... | 370/333 |

FOREIGN PATENT DOCUMENTS

JP   2005-086304   3/2005

* cited by examiner

*Primary Examiner* — Kamran Afshar
*Assistant Examiner* — Babar Sarwar
(74) *Attorney, Agent, or Firm* — Murphy & King, P.C.

(57) ABSTRACT

A wireless communication device capable of restraining dispersion of a propagation environment index and thereby improving throughput. A reception controller receives a pilot signal, measures a propagation environment and detects a phase change of the pilot signal. A moving average processor obtains a moving average of propagation environment values. An index function setter generates a propagation environment index function indicative of the correspondence between the propagation environment value and a propagation environment index which is a propagation environment quality index. When the detected phase change is greater than a threshold, a slope corrector corrects the slope of the propagation environment index function by using the moving average as a reference point, and a propagation environment index transmitter obtains a propagation environment index corresponding to the measured propagation environment value by using the propagation environment index function whose slope has been corrected, and transmits the obtained index to a base station.

6 Claims, 14 Drawing Sheets

WIRELESS COMMUNICATION DEVICE AND METHOD OF RESTRAINING DISPERSION OF PROPAGATION ENVIRONMENT INDEX

CROSS-REFERENCE TO RELATED APPLICATIONS

This application is based upon and claims the benefits of priority from the prior Japanese Patent Application No. 2007-243849, filed on Sep. 20, 2007, the entire contents of which are incorporated herein by reference.

BACKGROUND OF THE INVENTION

1. Field of the Invention

The present invention relates to wireless communication devices and methods of restraining dispersion of a propagation environment index. More particularly, the present invention relates to a wireless communication device for performing wireless communication such as W-CDMA (Wideband-Code Division Multiple Access) communication and a method of restraining dispersion of a propagation environment index used in such wireless communication.

2. Description of the Related Art

In recent years, what is called HSDPA (High Speed Downlink Packet Access), which is a wireless communication scheme based on the W-CDMA technology, has been actively researched and developed. HSDPA provides high-speed downlink packet transmission at a maximum of 14.4 Mbps (on average, 2 to 3 Mbps), which is three to four times faster than the downlink transmission rate of existing W-CDMA systems, and is standardized by the 3GPP Release 5 (3rd Generation Partnership Project Release 5).

FIG. 11 illustrates an overview of HSDPA. Mobile phones 111 to 113 and notebook computers 114 and 115 exist in the cell 100a of a base station 100. As illustrated, downlink packet transmission from the base station 100 to the mobile phone 111 and the notebook computer 114 is carried out according to the conventional W-CDMA scheme, while downlink packet transmission from the base station 100 to the mobile phones 112 and 113 and the notebook computer 115 is performed according to the HSDPA scheme.

In W-CDMA, packets are transmitted from the base station 100 at a uniform rate (maximum: 384 Kbps) regardless of where in the cell 100a the mobile phone 111 and the notebook computer 114 are located.

On the other hand, in HSDPA, the current radio wave reception states of individual terminals are detected and modulation schemes are switched so that the fastest modulation scheme may be selected. Accordingly, even though the terminals are located in the same cell 100a, available downlink transmission rates differ depending on the receiving conditions such as the distance from the base station.

For example, if the mobile phone 112 and the notebook computer 115 are located near the base station 100 and are in good receiving conditions without any obstacle therebetween, the mobile phone 112 and the notebook computer 115 can receive data at a maximum rate of 14.4 Mbps. On the other hand, if the mobile phone 113 is located near the border of the cell 100a far away from the base station 100 and is in bad receiving conditions, the mobile phone 113 receives data at a lower rate than 14.4 Mbps.

Thus, in HSDPA, adaptive modulation and coding process is carried out in accordance with the receiving conditions such that the downlink transmission rate is optimized. Specifically, the modulation scheme is switched between QPSK (Quadrature Phase Shift Keying: a modulation scheme in which only the phase of the carrier wave is changed to four states to transmit 2-bit information per symbol) used in the existing W-CDMA systems and 16 QAM (Quadrature Amplitude Modulation: a modulation scheme in which the phase and amplitude of the carrier wave are changed to create 16 states, thereby transmitting 4-bit information per symbol).

In addition to the switching of modulation schemes, a channel format (number of codes allocated, etc.) for transferring data to mobile terminals is also adaptively set in accordance with the receiving conditions. Thus, HSDPA permits high-speed downlink packet transmission as stated above and is expected to become a promising technique enabling high-speed mobile communication services.

As conventional techniques for HSDPA, there has been proposed a technique in which a temporal fluctuation characteristic of the reception quality of a mobile station is estimated and a target error rate is switched in accordance with the estimated temporal fluctuation characteristic so that the highest possible throughput may be obtained (e.g., Japanese Unexamined Patent Publication No. 2005-86304 (paragraph nos. [0025] to [0029], FIG. 1)).

Meanwhile, a base station for HSDPA carries out scheduling in accordance with radio wave receiving conditions, to select users to whom information is to be preferentially transmitted or to switch the modulation scheme or the channel format.

To perform the scheduling, the base station sends out a pilot signal with a certain carrier frequency, and mobile terminals present in the cell, such as mobile phones, receive the pilot signal.

When the pilot signal is received, each mobile terminal measures the current propagation environment and notifies the base station of a propagation environment index corresponding to the measured propagation environment. The base station transmits traffic data preferentially to mobile terminals in good propagation environments or selects suitable modulation schemes or channel formats.

Specifically, the propagation environment index denotes a CQI (Channel Quality Indicator) which is obtained by converting the SIR (Signal-to-Interference Ratio) of the pilot signal to one of 30 index values from "1" to "30" (indicative of the receive field strength). The CQI value "1" indicates the smallest SIR and thus the lowest receive level, and the CQI value "30" indicates the largest SIR and thus the highest receive level.

FIG. 12 illustrates a process flow from the reception of the pilot signal by a mobile terminal to the transfer of data from the base station.

S11: The base station transmits the pilot signal (CPICH: Common Pilot Channel).

S12: The mobile terminal receives the CPICH, then obtains a CQI of its own, and sends the obtained CQI back to the base station. When transmitting the CQI information to the base station, the mobile terminal uses a radio channel called DPCCH (Dedicated Physical Control Channel).

S13: The base station performs the scheduling in accordance with the received CQI.

S14: The base station sends control information obtained as a result of the scheduling, to the selected mobile terminal. When transmitting the control information to the mobile terminal, the base station uses a radio channel called SCCH (Shared Control Channel).

S15: In accordance with the received control information, the mobile terminal switches its transmit/receive function.

S16: Using the communication service set by the scheduling, the base station transmits data to the corresponding mobile terminal. In this case, the data is sent to the mobile terminal via a radio channel called PDSCH (Physical Downlink Shared Channel).

Since the mobile terminal is required to set its transmit/receive function after receiving the control information including the scheduling results, the base station sends the PDSCH after a lapse of a fixed time from the transmission of the control information so that the mobile terminal may be prepared for the reception of data.

FIG. 13 illustrates allocation of the PDSCH to mobile terminals. To allocate the PDSCH to mobile terminals, the base station divides the PDSCH into time slots so that one time slot (2 ms) may be used by a single mobile terminal or shared by two or more mobile terminals.

Also, each cell has a plurality of PDSCH channels, and in the case of HSDPA, there are 15 channels separated in the direction of spreading code (the 15 channels are distinguished from one another by their spreading codes). Thus, in the case of downlink data transmission, the PDSCH is shared in such a manner that the time slots arrayed in both the direction of time and the direction of spreading code are allocated to mobile terminals.

For example, where the time slots t1 of the PDSCH are used to carry data and a certain mobile terminal with high priority is selected by the scheduling, the time slot t1 of the PDSCH channel CH1 only or the time slots t1 of all the 15 PDSCH channels CH1 to CH15 are used to transfer the data to the selected mobile terminal (the scheduling also determines which and how many time slots to use and how many PDSCH channels to use).

In the aforementioned manner, the mobile terminal measures the CQI and transmits the measured CQI to the base station, which then carries out scheduling on the basis of the received CQI so that the scheduling results may be reflected in the data transmission from the base station to the mobile terminal via the PDSCH. The conventional HSDPA communication is, however, associated with the problem that the downlink throughput lowers if the accuracy in the CQI measurement by the mobile terminal is low.

While the mobile terminal remains stationary or is moving at low speeds, variation (dispersion) in the measured CQI value is small, but when the mobile terminal is moving at high speeds, the dispersion of the CQI is significantly great because of channel variation and the like attributable to fading (phenomenon wherein the radio wave receive level fluctuates with movement of the terminal or with time).

FIG. 14 is a conceptual diagram of CQI dispersion characteristic, wherein the horizontal axis indicates the CQI and the vertical axis indicates the frequency (%) of occurrence of identical CQI. It is assumed here that an ideal CQI measured by the mobile terminal in a certain environment is "a" ($1 \leq a \leq 30$).

While the mobile terminal in the environment wherein the CQI is equal to "a" remains stationary or is moving at low speeds, the measured CQI shows a dispersion characteristic curve K1, indicating that the most frequently measured CQI is "a" and that the dispersion has a narrow width with respect to "a". In contrast, when the mobile terminal is moving at high speeds, the measured CQI shows a dispersion characteristic curve K2, which indicates that the CQI value "a" is measured less frequently and that the dispersion has a greater width with respect to "a".

Specifically, where the CQI is measured a plurality of times while the mobile terminal remains stationary or is moving at low speeds, an identical CQI value (in this case, "a") is measured most frequently and other measured values, though not identical with "a", are close to "a" (the ideal value "a" is measured on most occasions).

On the other hand, where the CQI is measured a plurality of times while the mobile terminal is moving at high speeds, an identical CQI value ("a") is measured less frequently and also the measured CQI values vary significantly (CQI values greatly different from the ideal value "a" are frequently measured).

Thus, while the mobile terminal remains stationary or is moving at low speeds, the ideal CQI (=a) matching the actual receiving environment is measured on most occasions, and therefore, lowering of the throughput does not occur. Even if CQI values different from the value "a" are measured, the measured CQI values are very close to the ideal value "a". Accordingly, such slightly different CQI values do not require the base station to greatly change the scheduling results to be reflected in the PDSCH, and a situation where the throughput significantly lowers does not occur.

While the mobile terminal is moving at high speeds, on the other hand, the throughput significantly lowers. Let us suppose that the CQI value "a1", for example, which is significantly smaller than the ideal value "a" as shown in FIG. 14, is measured and transmitted to the base station for the scheduling.

In this case, even though the actual receiving environment of the mobile terminal satisfies CQI=a and thus is better than the measured environment ("a1"), the base station performs the scheduling on the basis of the measured environment worse than the actual receiving environment of the mobile terminal. As a result, the base station sets a smaller PDSCH format for transferring data, so that the throughput significantly lowers.

Setting a smaller PDSCH format means decreasing the amount of data transferred. For example, in FIG. 13, when CQI=a, data is forwarded by using the time slots t1 and t2 of the ten PDSCH channels CH1 to CH10, and when CQI=a1, data is transferred by using the time slots t1 and t2 of the PDSCH channels CH1 to CH5 or by using only the time slots t1 of the PDSCH channels CH1 to CH10. Consequently, the throughput lowers because the amount of data forwarded from the base station is smaller than that which the mobile terminal can actually receive.

Let us suppose now that while the mobile terminal is moving at high speeds, the CQI value "a2", for example, which is significantly greater than the ideal value "a" as shown in FIG. 14, is measured and transmitted to the base station for the scheduling.

In this case, although the actual receiving environment of the mobile terminal just fulfills CQI=a and thus is worse than the measured environment ("a2"), the base station performs the scheduling on the basis of the measured environment better than the actual receiving environment of the mobile terminal. Consequently, the base station sets a larger PDSCH format for transferring data, and since retransmission frequently occurs as a result, the throughput significantly lowers.

Setting a larger PDSCH format means increasing the amount of data transferred. For example, in FIG. 13, when CQI=a, data is forwarded by using the time slots t1 and t2 of the ten PDSCH channels CH1 to CH10, and when CQI=a2, data is transferred by using the time slots t1 and t2 of all the 15 PDSCH channels CH1 to CH15 or by using the time slots t1, t2 and t3 of the PDSCH channels CH1 to CH10.

Consequently, the amount of data forwarded from the base station is greater than that which the mobile terminal can actually receive. Since the error rate of the mobile terminal increases, the mobile terminal frequently requests retransmission, with the result that the throughput lowers.

As explained above, the conventional HSDPA communication takes no account of the CQI measurement accuracy of mobile terminals. Accordingly, data transfer control not matching the actual receiving environment is often carried out, giving rise to a problem that the throughput lowers.

SUMMARY OF THE INVENTION

The present invention was created in view of the above circumstances, and an object thereof is to provide a wireless communication device capable of efficiently restraining CQI dispersion thereof, thereby improving throughput.

Another object of the present invention is to provide a method of restraining dispersion of a propagation environment index, whereby CQI dispersion of mobile terminals can be efficiently restrained, thereby improving throughput.

To achieve the object, there is provided a wireless communication device for performing wireless communication. The wireless communication device comprises a reception controller for performing a process of receiving a pilot signal transmitted from a base station and measuring a propagation environment to obtain a propagation environment value, and a process of detecting an amount of phase change of the pilot signal, a moving average processor for obtaining a moving average of a plurality of propagation environment values successively measured by the reception controller, a propagation environment index function setter for setting a propagation environment index function indicative of a correspondence relationship between the propagation environment value and a propagation environment index which is a quality index of the propagation environment, a slope corrector for correcting a slope of the propagation environment index function by using the moving average as a reference point, and a propagation environment index transmitter for obtaining a propagation environment index corresponding to the measured propagation environment value by using the propagation environment index function, and transmitting the obtained propagation environment index to the base station, wherein the slope corrector compares the amount of phase change of the pilot signal detected by the reception controller with a threshold and, when the detected amount of phase change is judged to be greater than the threshold, corrects the slope of the propagation environment index function by using the moving average as the reference point such that dispersion of the propagation environment index is restrained, and the propagation environment index transmitter obtains the propagation environment index corresponding to the measured propagation environment value by using the propagation environment index function of which the slope has been corrected, and transmits the obtained propagation environment index to the base station.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
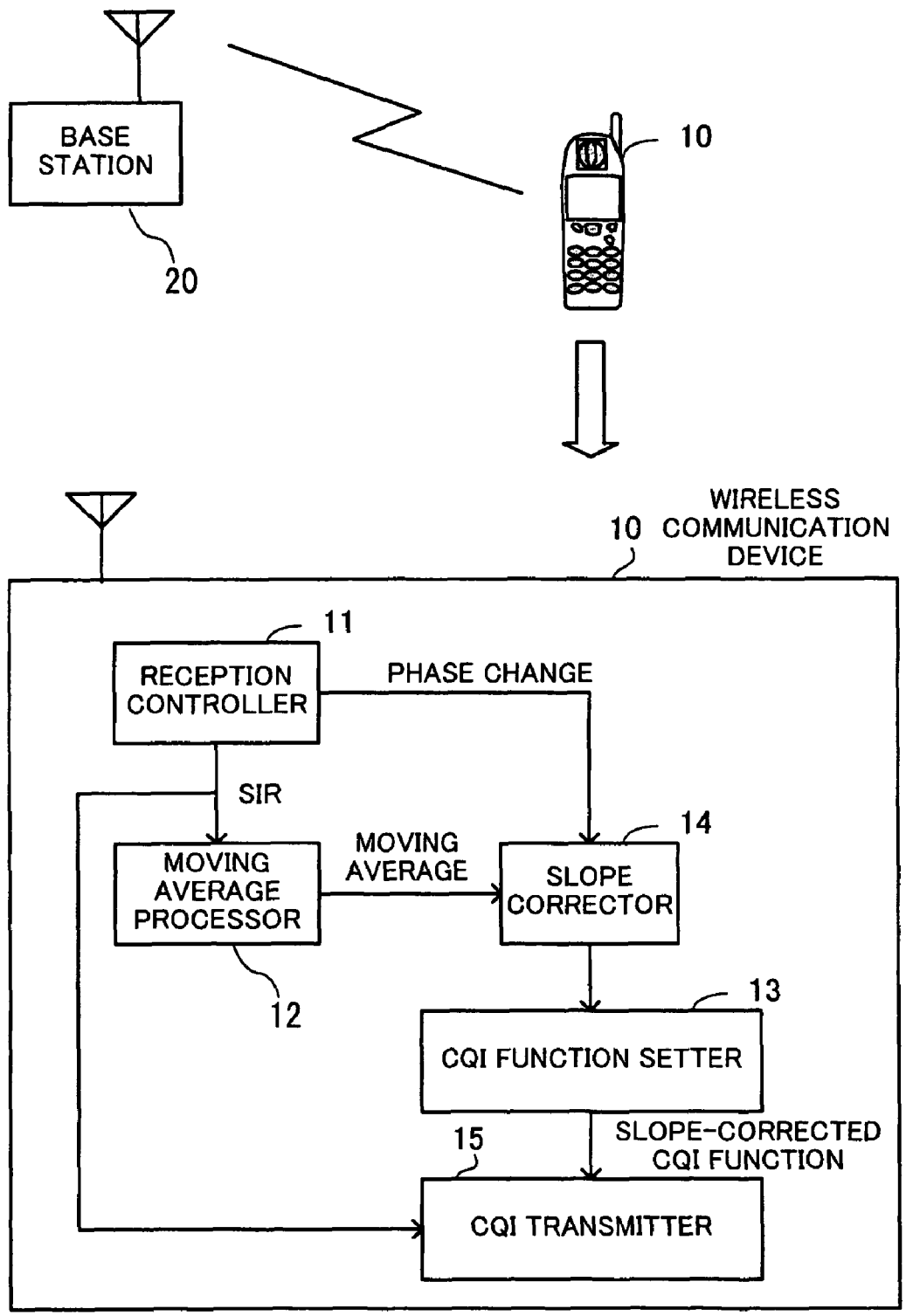
FIG. 1 illustrates the principle of a wireless communication device.

Preferred embodiments of the present invention will be described below with reference to the accompanying drawings. FIG. 1 illustrates the principle of a wireless communication device. The wireless communication device 10 comprises a reception controller 11, a moving average processor 12, a propagation environment index function setter 13, a slope corrector 14 and a propagation environment index transmitter 15, and is a mobile terminal for performing HSDPA communication.

The reception controller 11 receives a pilot signal (CPICH) transmitted from a base station 20, and measures its propagation environment to obtain a propagation environment value. Measuring the propagation environment means measuring the channel quality in the current receiving environment, and an SIR is acquired as the propagation environment value. The reception controller 11 also detects an amount of phase change of the CPICH (the phase change detection will be described later with reference to FIG. 2).

Reception control for the CPICH will be briefly explained. When the CPICH (or data signal) transmitted from the base station 20 is received, it has a plurality of peaks because of multipath fading.

Thus, when the CPICH having multiple peaks at timings t1 to tn, respectively, is received, the CPICH is de-spread at the timings t1, t2, . . . , tn by a de-spreading process (correlation detection is performed using the same spreading code as that used at the transmitting side for spreading).

Subsequently, the n de-spread signals are brought in phase and subjected to in-phase addition by RAKE combining. This reception process makes it possible to lessen the fading interference of the CPICH, and the SIR is measured (estimated) from the received signal (instead of the SIR, a CIR (Carrier-to-Interference Ratio) may be estimated).

Figure 3:
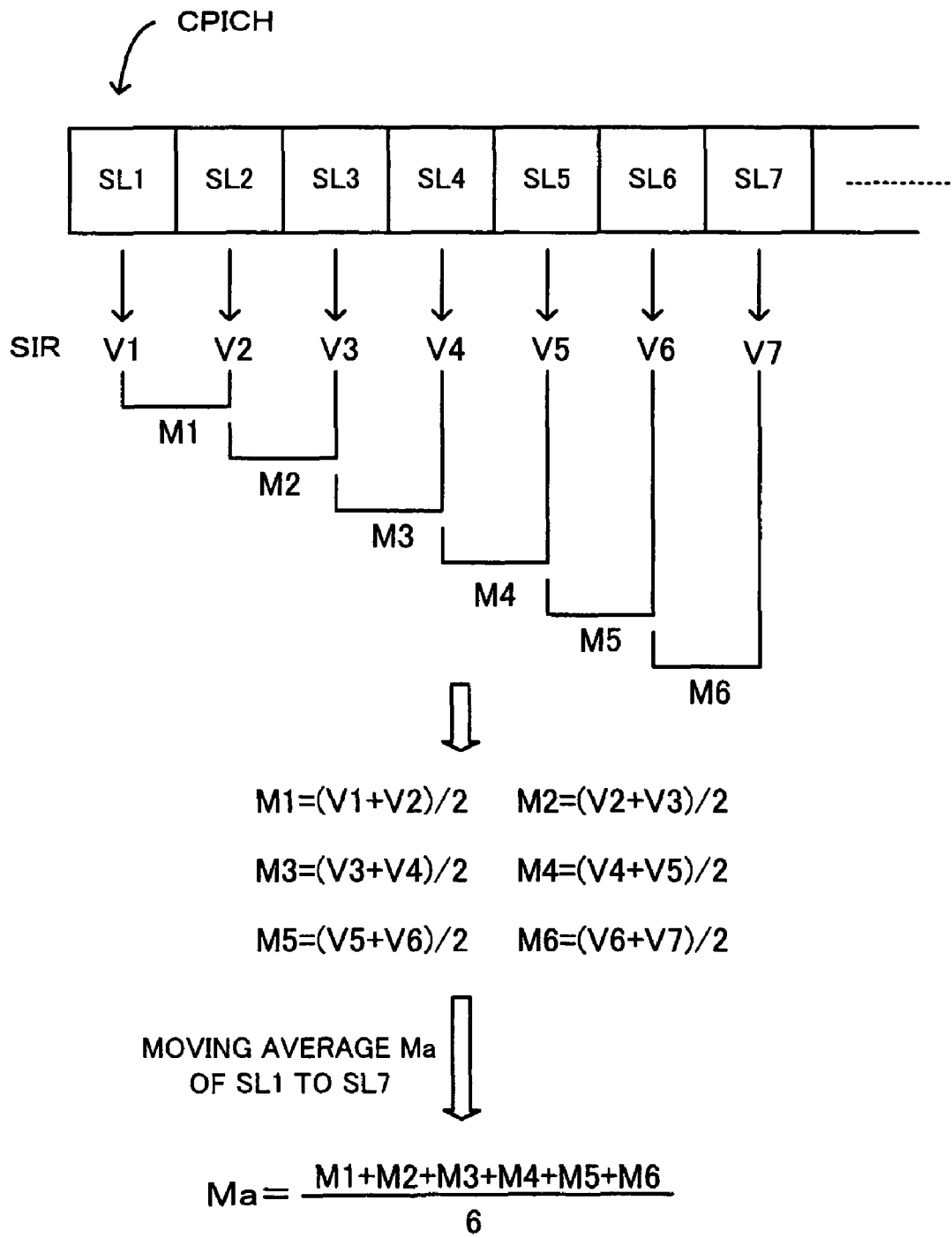
FIG. 3 illustrates an example of calculating a moving average.

The moving average processor 12 obtains a moving average of a plurality of SIRs (in the manner described later with reference to FIG. 3). The propagation environment index function setter 13 sets a propagation environment index function indicative of the correspondence relationship between the SIR and a propagation environment index, which is a quality index of propagation environment. In the following, the propagation environment index will be referred to as CQI, the propagation environment index function as CQI function, and the propagation environment index function setter 13 as CQI function setter 13.

The slope corrector 14 corrects the slope of the CQI function by using the moving average as a reference point. The propagation environment index transmitter 15 (hereinafter referred to as CQI transmitter 15) obtains a CQI corresponding to the measured SIR by using the CQI function, and transmits the obtained CQI to the base station 20.

Specifically, the slope corrector 14 compares the amount of phase change of the pilot signal, detected by the reception controller 11, with a threshold. If the phase change of the CPICH detected by the reception controller 11 is greater than the preset threshold, the slope corrector 14 reduces the slope of the CQI function by using the moving average as the reference point so that dispersion of the CQI may be restrained.

Then, using the CQI function whose slope has been corrected, the CQI transmitter 15 obtains a CQI corresponding to the measured SIR, and then transmits the obtained CQI to the base station 20 (details of the slope correction will be described with reference to FIGS. 4 to 10).

Figure 2:
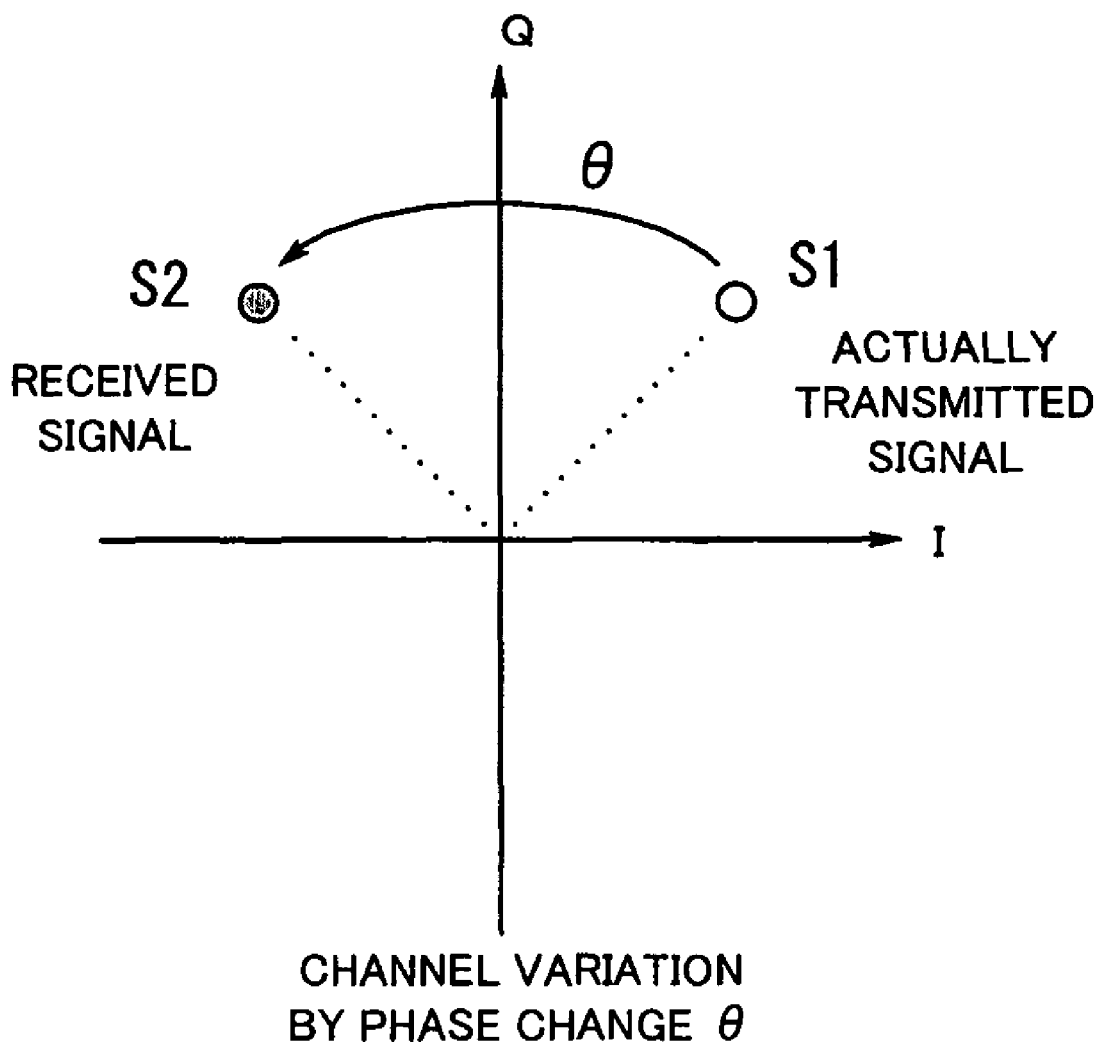
FIG. 2 illustrates detection of an amount of phase change.

The process for detecting the phase change of the CPICH by the reception controller 11 will be now described with reference to FIG. 2. As a signal is propagated in a fading environment, the amplitude of the signal varies before the signal is received, so that the phase of the received signal is changed (rotated).

Taking QPSK as an example, let us suppose that a symbol of the signal (in this instance, CPICH) is actually transmitted from the transmitting side at point S1 but is received by the receiving side at point S2 because of rotation of the phase by θ due to fading.

The reception controller 11 is aware that the received signal should originally have the phase S1 and, therefore, can determine how much the phase has rotated due to the current fading. Usually, the amount of phase change is small (fading interference is small) while the mobile terminal remains stationary or is moving at low speeds, and is large (fading interference is large) when the mobile terminal is moving at high speeds. Accordingly, by detecting the amount of phase change, it is possible to determine the state of the mobile terminal (or the degree of fading interference), namely, whether the mobile terminal remains stationary (or is moving at low speeds) or is moving at high speeds.

The moving average processor 12 will be now described. FIG. 3 illustrates an example of calculating a moving average. The reception controller 11 measures the SIR of each slot of the CPICH, and the illustrated example shows the manner of how a moving average of the SIRs of slots SL1 to SL7 is obtained by the moving average processor 12.

Let us suppose that values V1 to V7 are measured as the SIRs of the respective slots SL1 to SL7.

The moving average processor 12 obtains an average M1 of the SIRs of the slots SL1 and SL2 according to (V1+V2)/2, and obtains an average M2 of the SIRs of the slots SL2 and SL3 according to (V2+V3)/2.

Similarly, an average M3 of the SIRs of the slots SL3 and SL4 is obtained according to (V3+V4)/2, an average M4 of the SIRs of the slots SL4 and SL5 is obtained according to (V4+V5)/2, an average M5 of the SIRs of the slots SL5 and SL6 is obtained according to (V5+V6)/2, and an average M6 of the SIRs of the slots SL6 and SL7 is obtained according to (V6+V7)/2.

Then, using the six averages, a moving average Ma is calculated according to (M1+M2+M3+M4+M5+M6)/6. In the above example, the average of the SIRs of every two successive slots is calculated to obtain six averages, then the six averages are added together, and the sum is divided by "6" to obtain a single average as the moving average. Alternatively, the average of the SIRs of every three successive slots may be calculated to obtain three averages, and the moving average may be calculated from the obtained three averages.

The above moving average calculation can be generalized as follows. The reception controller 11 measures the SIRs of the individual slots SL1, SL2, . . . , SLm of the CPICH and obtains values V1, V2, . . . , Vm as the respective SIRs (this is equivalent to the process of measuring the SIR of the CPICH received at times t1, t2, . . . , tm to obtain values V1, V2, . . . , Vm as the respective SIRs).

The moving average processor 12 calculates an average M1 of the values V1 to Vk, an average M2 of the values Vk to V(2k−1), . . . , and an average Mq of the values Vm−(k−1) to Vm, and obtains a moving average according to (M1+M2+ . . . +Mq)/q. In the above, the quotient of the division m÷q plus "1" represents k (the quotient of the division m÷q represents k−1).

In the aforementioned example wherein the average of every successive two of the values V1 to V7 is obtained, k=2 and m=7. Accordingly, an average M1 of the values V1 and V2, an average M2 of the values V2 and V3, . . . , and an average M6 (=Mq) of the values V7−(2−1) (=V6) and V7 are calculated.

For q, the quotient of the division of "7" (=m) divided by q should be "1" (=2−1) (the quotient of the division 7/q represents "1"), and "6" qualifies as q. Thus, q, which is the denominator of the fraction for calculating the moving average, is "6", hence the moving average Ma=(M1+M2+M3+M4+M5+M6)/6.

Where the average of every successive three of the values V1 to V7 is obtained, for example, k=3 and m=7. Accordingly, an average M1 of the values V1 to V3, an average M2 of the values V3 to V5 and an average M3 (=Mq) of the values V7−(3−1) (=V5) to V7 are calculated.

For q, the quotient of the division of "7" (=m) divided by q should be "2" (=3−1) (the quotient of the division 7/q represents "2"), and "3" qualifies as q. Thus, q, which is the denominator of the fraction for calculating the moving average, is "3", hence the moving average Ma=(M1+M2+M3)/3.

Figure 4:
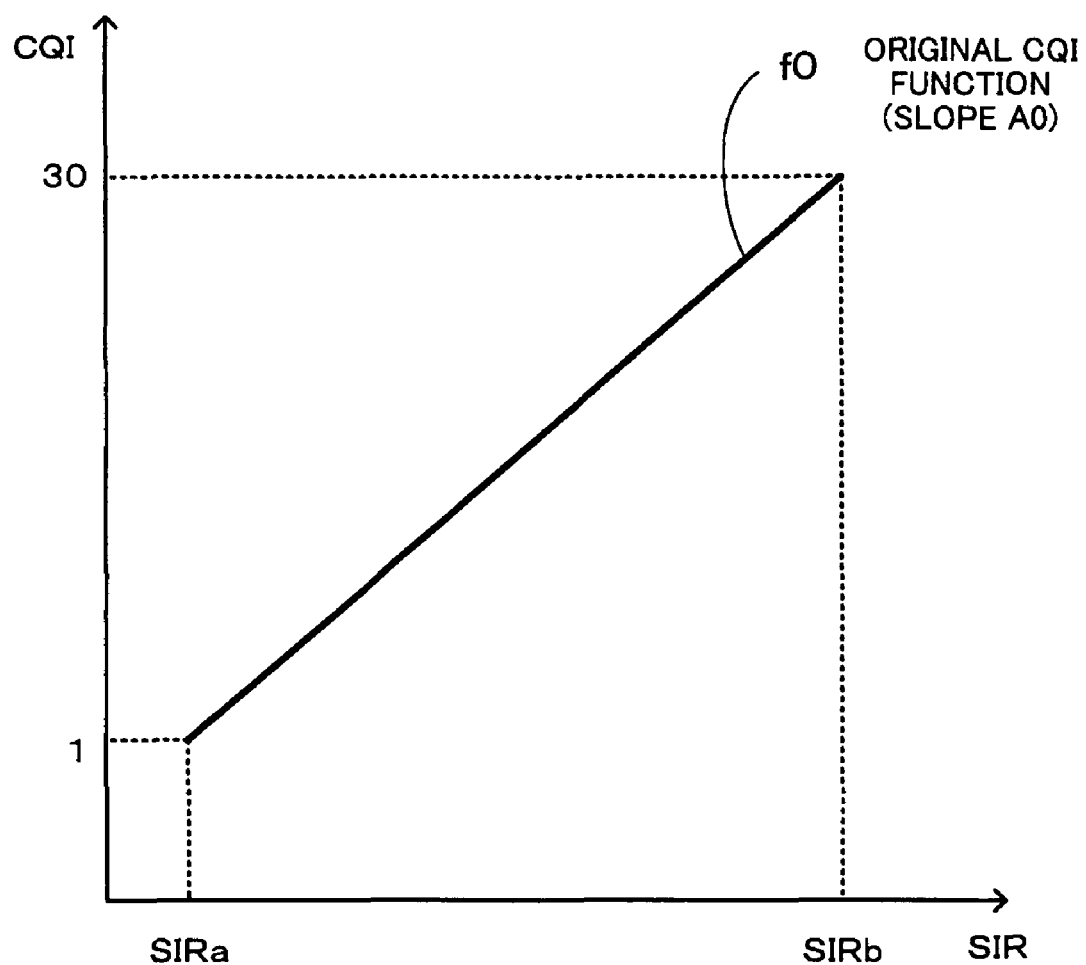
FIG. 4 illustrates a CQI function.

The slope correction will be now described in detail. FIG. 4 illustrates a CQI function, wherein the horizontal axis indicates the SIR of the CPICH and the vertical axis indicates the CQI. The figure shows a CQI function f0 set at the start of operation. A total of 30 CQIs from the minimum value "1" to the maximum value "30" are correlated with the measured SIR ranging from SIRa to SIRb.

When the operation of the mobile terminal is started, the CQI function setter 13 sets the CQI function f0 having such a slope A0 as to range from the CQI value "1" to the CQI value "30". At the start of operation, therefore, the SIR of the CPICH measured by the reception controller 11 can be converted to any one of the CQI values from "1" to "30", and the CQI transmitter 15 transmits one of the CQI values from "1" to "30" to the base station 20 as the CQI converted from the measured SIR.

Figure 5:
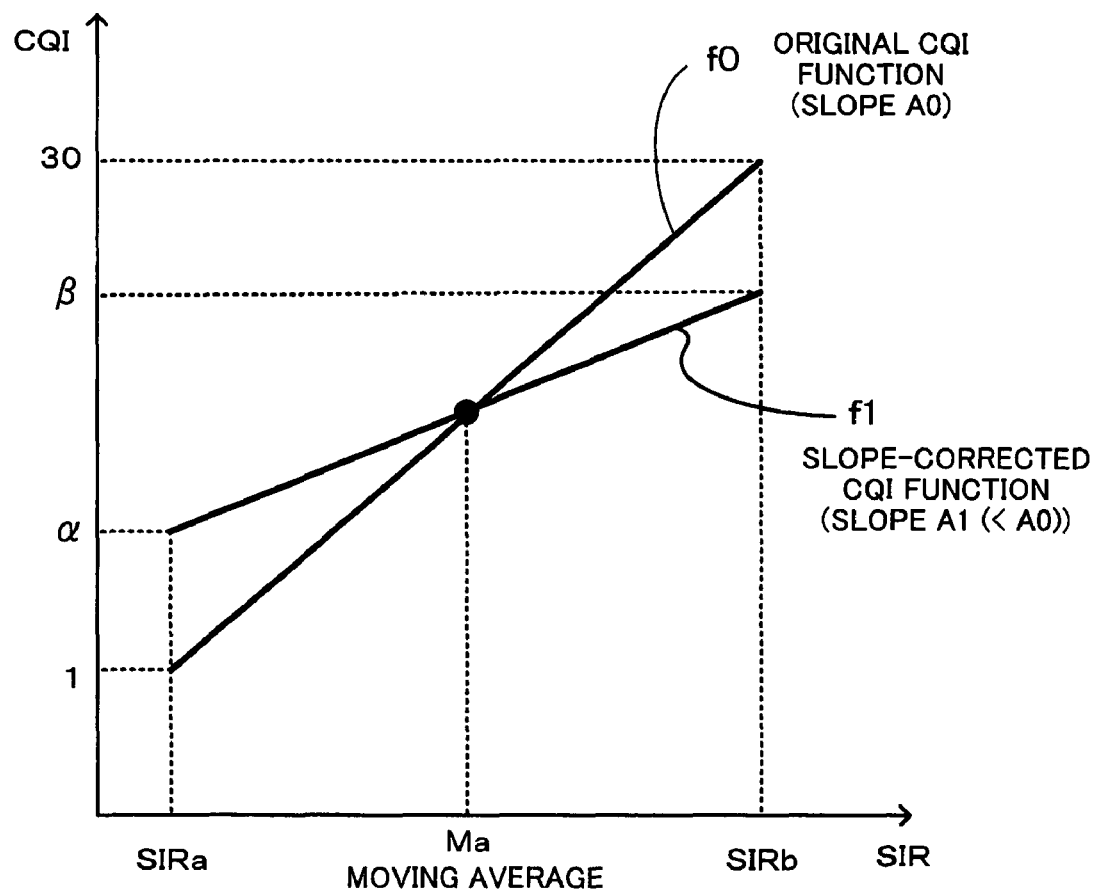
FIG. 5 illustrates a CQI function with a corrected slope.

FIG. 5 shows a CQI function with a corrected slope, wherein the horizontal axis indicates the SIR of the CPICH and the vertical axis indicates the CQI. The slope corrector 14 receives the amount of phase change of the CPICH, detected by the reception controller 11, and compares the phase change with the threshold. It is assumed here that an amount of phase change exceeding the threshold has been detected (the mobile terminal is moving at a high speed and judges that it is being strongly affected by fading interference).

In this case, the slope corrector 14 reduces the slope of the CQI function f0 currently set by the CQI function setter 13, by using, as the reference point, the moving average Ma of SIRs calculated by the moving average processor 12, to generate a CQI function f1.

Specifically, provided that the slope to be corrected to is A1 (<A0), a function curve passing through the coordinate point of the moving average Ma and having the slope A1 is set as the CQI function f1 (the slope of a CQI function passing through the coordinate point of the moving average Ma is corrected to A1).

For example, where the CQI function f0 is a linear function y=(A0)x+(B0) passing through coordinate points (SIRa, 1) and (SIRb, 30) (B0 is a y-intercept), the CQI function f1 is given by y=(A1)x+(B1) which passes through coordinate points (SIRa, α) and (SIRb, β) (A1<A0; B1 is a y-intercept) and in which, when x=Ma, the y coordinate of the CQI function f1 is equal to that of the CQI function f0 (A0·Ma+ B0=A1·Ma+B1).

As seen from FIG. 5, in the case of the CQI function f0, the CQI can assume all of the index values from "1" to "30" with respect to the SIR range from SIRa to SIRb, but in the case of the CQI function f1 whose slope is reduced, the CQI can assume a value in the range of α to β (1<α<β<30) with respect to the SIR range from SIRa to SIRb.

Figure 6:
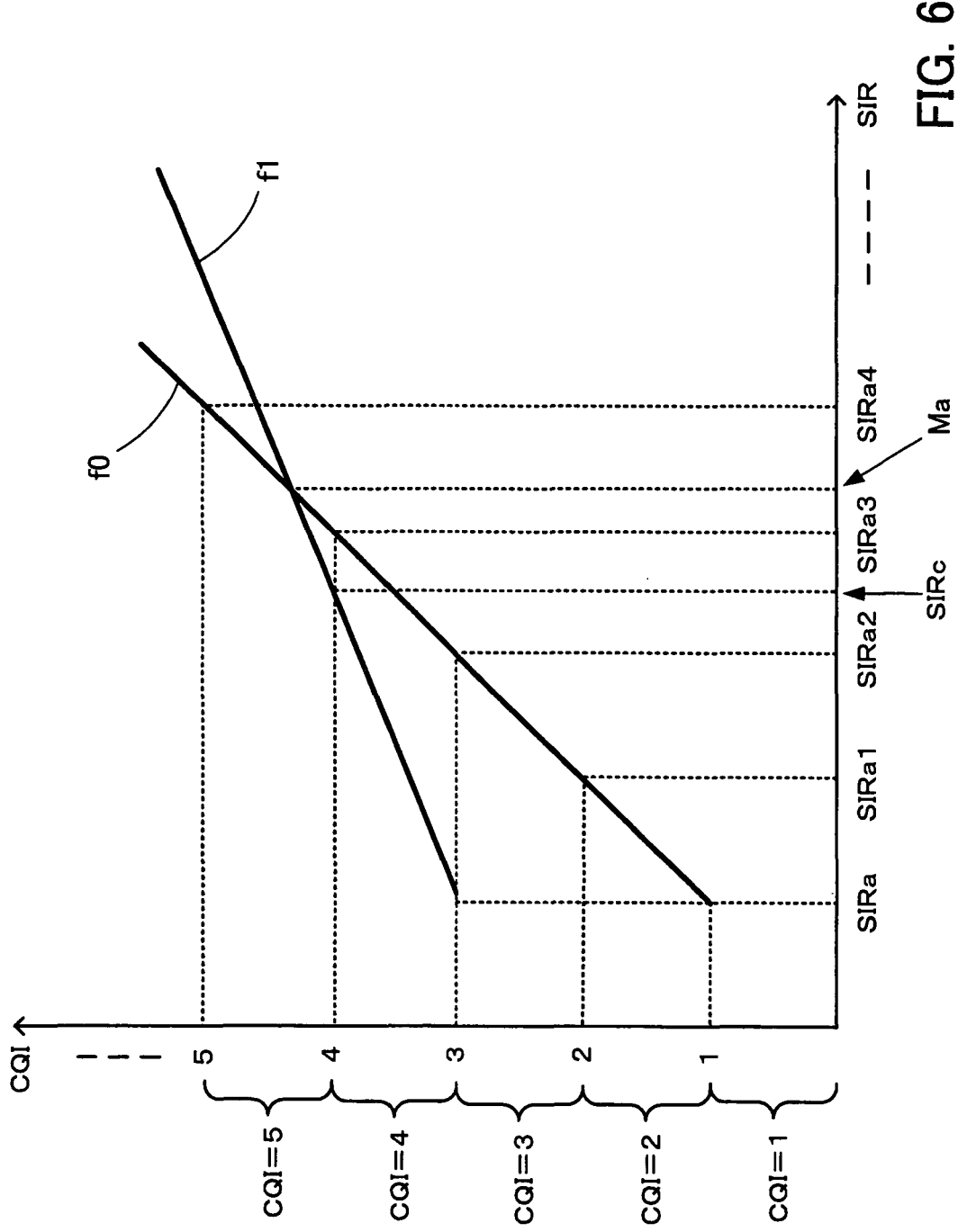
FIG. 6 exemplifies SIR/CQI conversion using the CQI function.

FIG. 6 exemplifies SIR/CQI conversion using the CQI function, wherein the horizontal axis indicates the SIR of the CPICH and the vertical axis indicates the CQI. Let it be assumed that SIR0 represents the measured SIR and that the SIR/CQI conversion is performed using the CQI function f0. In this case, when SIR0≦SIRa, for example, "1" is derived as the CQI, and when SIRa<SIR0≦SIRa1, "2" is derived as the CQI.

Similarly, "3" is derived as the CQI when SIRa1<SIR0≦SIRa2, "4" is derived as the CQI when SIRa2<SIR0≦SIRa3, "5" is derived as the CQI when SIRa3<SIR0≦SIRa4, and so on.

On the other hand, where the SIR/CQI conversion is performed by using the slope-corrected CQI function f1, "3" is derived as the CQI when SIR0≦SIRa, "4" is derived as the CQI when SIRa<SIR0≦SIRc, and "5" is derived as the CQI when SIRc<SIR0≦SIRa4.

In this manner, even if an identical value is measured as the SIR, the CQI assumes different values before and after the slope correction. After the slope correction, the value that the CQI can assume with respect to the measured SIR is limited to a narrower range centered on the moving average.

Figure 14:
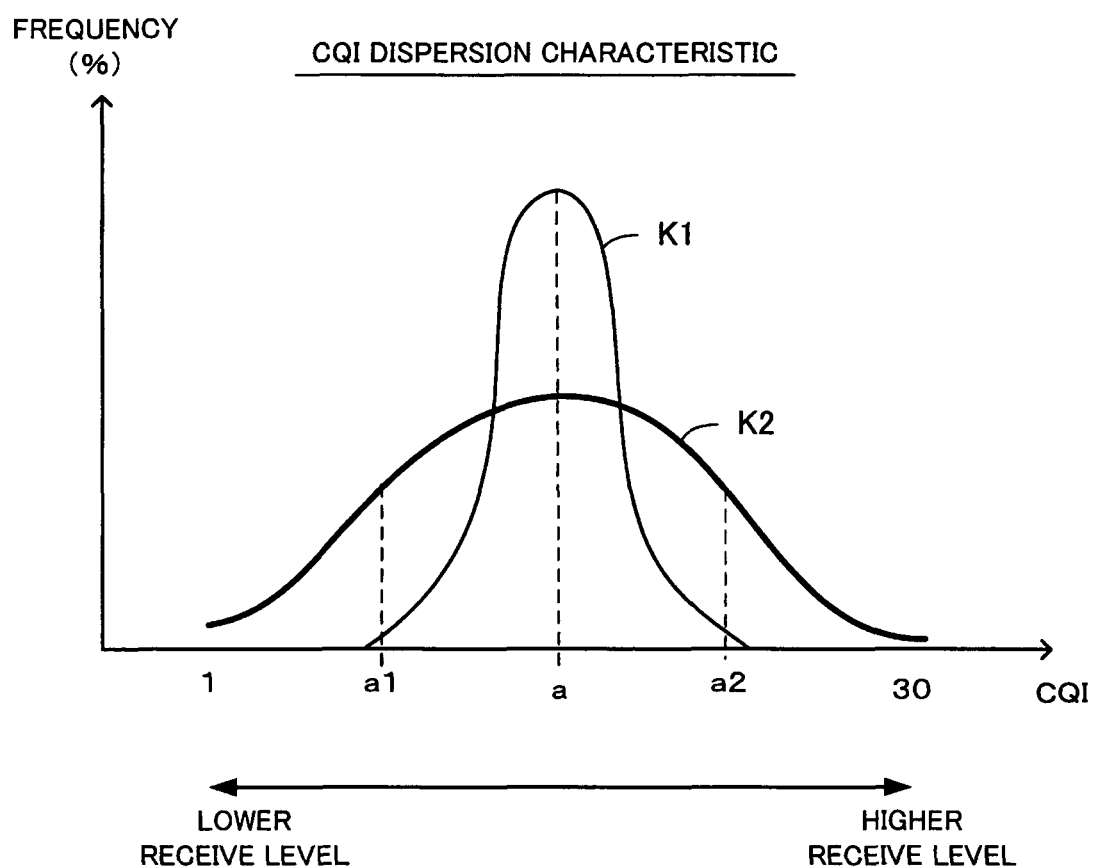
FIG. 14 is a conceptual diagram of CQI dispersion characteristic.

In cases where the wireless communication device 10 remains stationary or is moving at low speeds, the dispersion of the CQI is small as explained above with reference to FIG. 14, and thus an accurate CQI is obtained on most occasions. No problem therefore arises if the SIR/CQI conversion is effected using the CQI function f0 in accordance with which the CQI can assume any of the values from "1" to "30" with respect to the SIR range from SIRa to SIRb, to convert the measured SIR to a corresponding CQI.

On the other hand, when the wireless communication device 10 is moving at high speeds, the accuracy of the obtained CQI (accuracy of the measured SIR) lowers, with the result that the dispersion of the CQI enlarges, as explained above with reference to FIG. 14. Thus, if the SIR/CQI conversion is effected by using the CQI function f0 in accordance with which the CQI can assume any of the values from "1" to "30" with respect to the SIR range from SIRa to SIRb, a problem arises in that a CQI greatly different from the actual environment may possibly be transmitted to the base station 20.

Accordingly, when the wireless communication device is moving at high speeds, the slope corrector 14 reduces the slope of the CQI function f0 by using the moving average as the reference point, to obtain the CQI function f1 in accordance with which the value that the CQI can assume with respect to the SIR range from SIRa to SIRb is restricted to the narrower range of α to β than the original range of "1" to "30".

Thus, even if the measured SIR contains a significant error because of fading environment, a situation where the SIR is converted to an extremely improper CQI can be prevented because the CQI to which the SIR is converted can assume a value within the narrowed range.

As a consequence, the scheduling is not caused to substantially (erroneously) change from the one that should originally be applied, and the base station 20 can perform the scheduling in a manner generally matching the actual receiving environment. Accordingly, lowering of the throughput can be restrained, making it possible to achieve improved throughput, compared with the conventional HSDPA.

Figure 7:
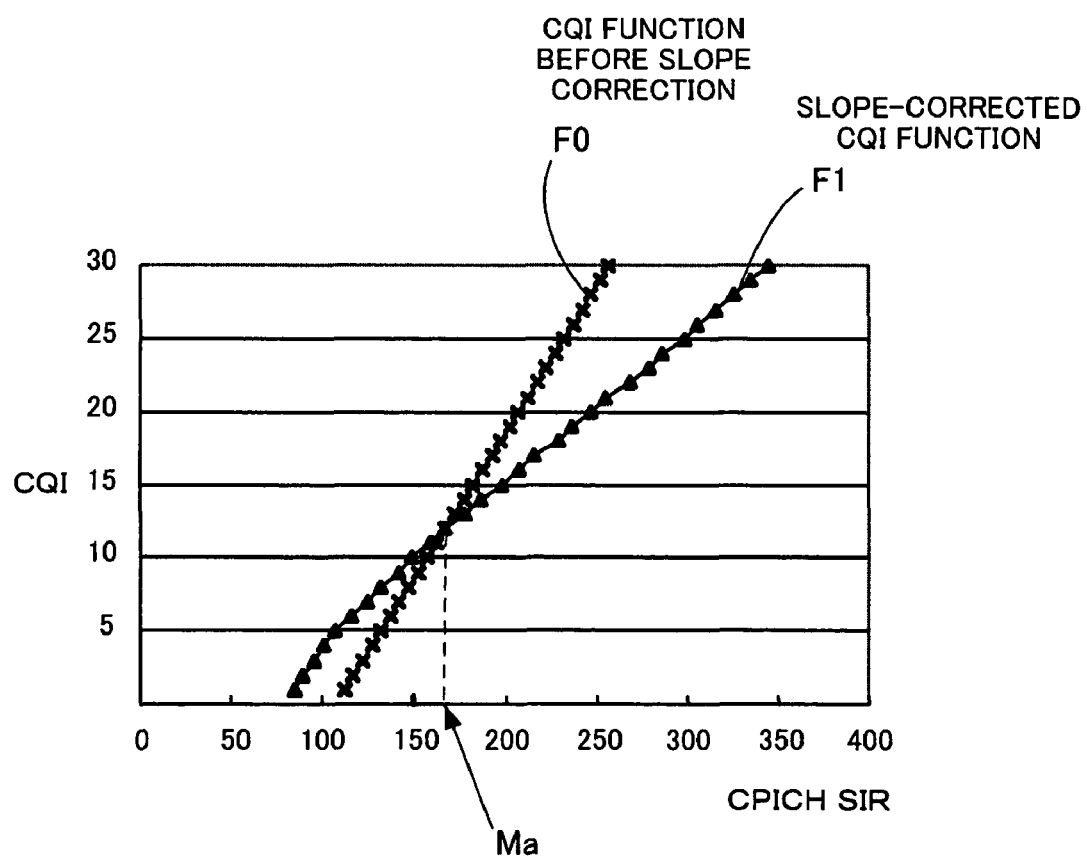
FIG. 7 illustrates correction of the slope of the CQI function.
Figure 8:
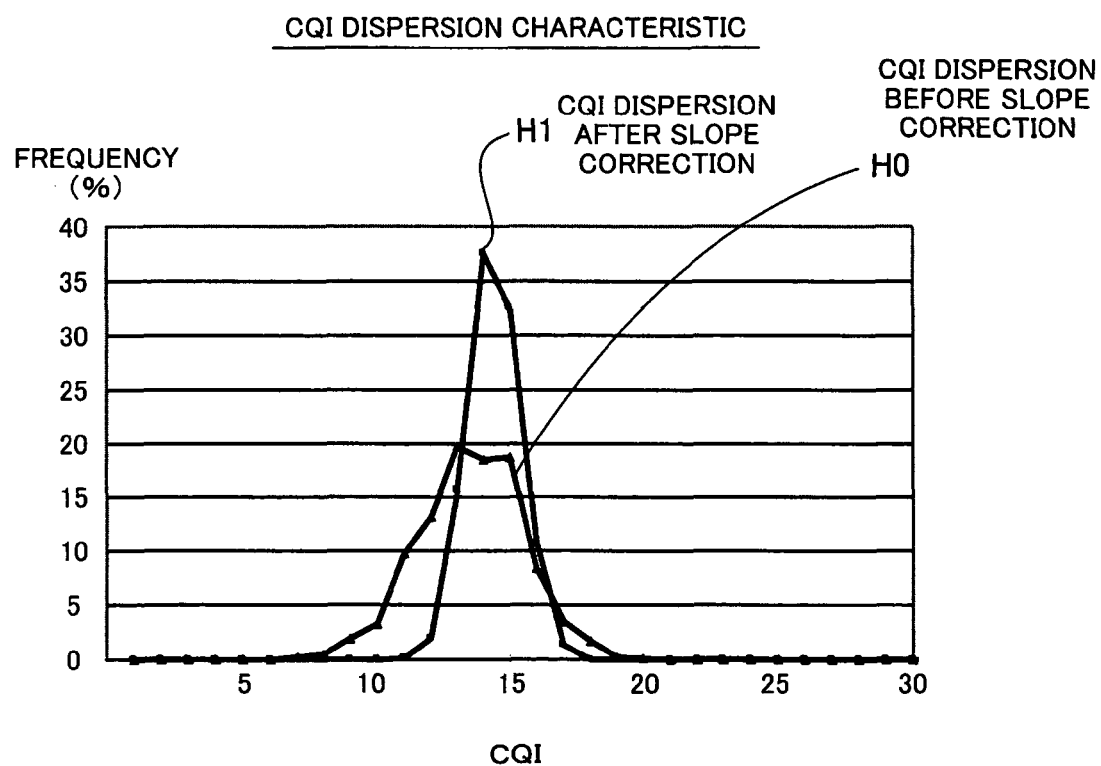
FIG. 8 shows CQI dispersion characteristics.

Simulation results are shown in FIGS. 7 and 8. FIG. 7 illustrates slope correction of a CQI function, wherein the horizontal axis indicates the SIR of the CPICH and the vertical axis indicates the CQI. Specifically, the figure shows a CQI function F0 before the slope correction and a CQI function F1 with a gentler slope, which is obtained by correcting the slope of the CQI function F0 by using the moving average Ma as the reference point.

FIG. 8 shows CQI dispersion characteristics, wherein the horizontal axis indicates the CQI and the vertical axis indicates the frequency (%) of occurrence of identical CQI. In the figure, H0 indicates the CQI dispersion obtained with the CQI function F0 whose slope is not corrected, and H1 indicates the CQI dispersion obtained with the CQI function F1 with the corrected slope. It is clear from the figure that the CQI dispersion characteristic H1 has a smaller width and thus restrained dispersion (restrained variation in the CQI). The throughput was measured by evaluation tests conducted in an indoor environment, and increase of the throughput from about 800 kbps to about 1100 kbps was observed.

The following describes slope correction control in which the slope of the CQI function is variably set in stages in accordance with the amount of phase change. The slope corrector 14 holds a plurality of thresholds TH1, TH2, . . . , THn (TH1<TH2< . . . <THn) to be compared with the phase change of the CPICH. Let the measured amount of phase change be θk (0≦k≦n−1).

Figure 9:
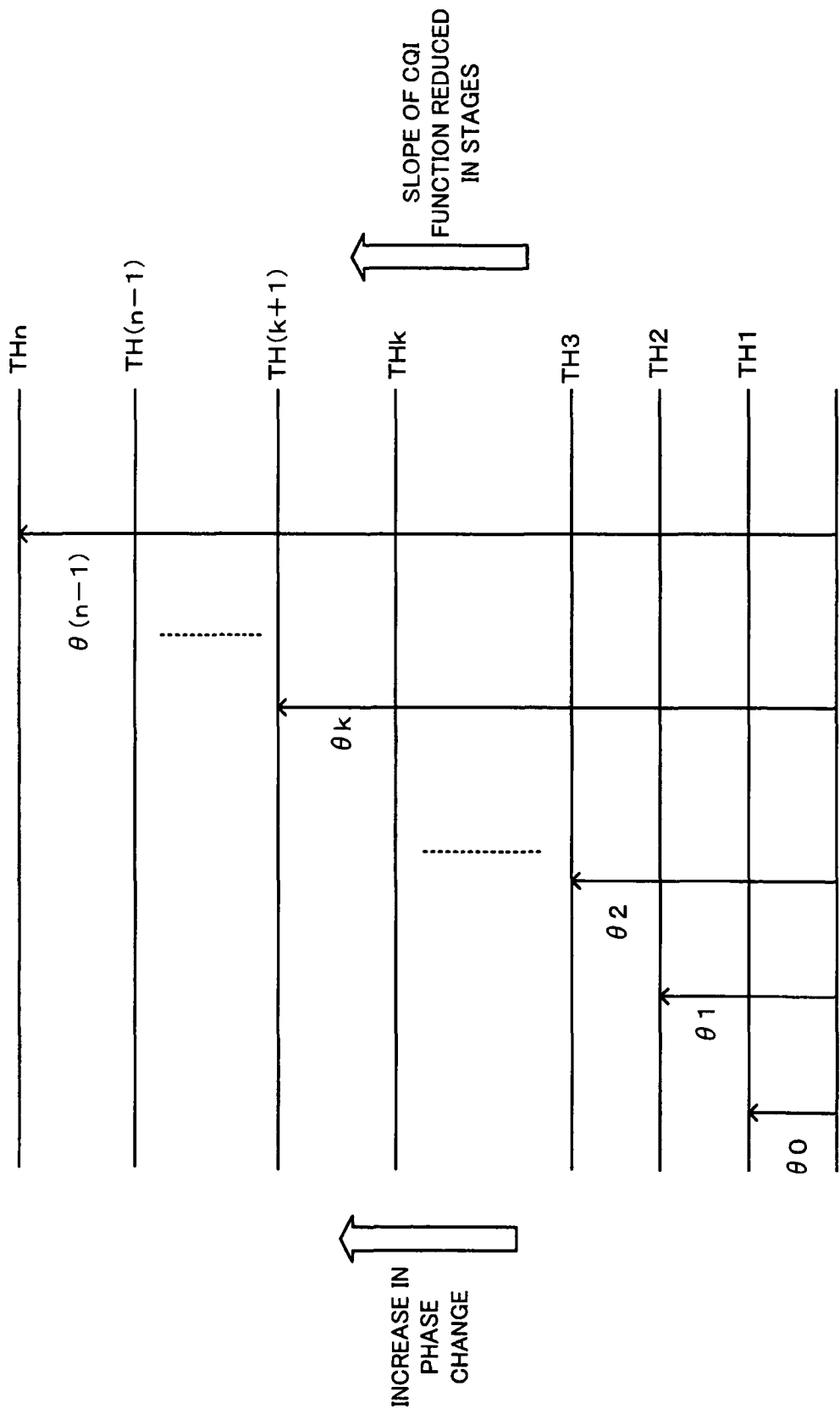
FIG. 9 shows the correspondence relationship between phase change and thresholds.

FIG. 9 illustrates the correspondence relationship between phase change and the thresholds. As shown in the figure, the relationship between the amount of phase change θ and the threshold TH is: θ0≦TH1, TH1<θ1≦TH2, TH2<θ2≦TH3, . . . , THk<θk≦TH(k+1), . . . , TH(n−1)<θ(n−1)≦THn.

The phase change θ with a smaller k value indicates a situation where the influence of fading interference is weaker (corresponding to the case where the mobile terminal remains stationary or is moving at low speeds), and the phase change θ with a larger k value indicates a situation where the influence of fading interference is stronger (corresponding to the case where the mobile terminal is moving at high speeds).

Figure 10:
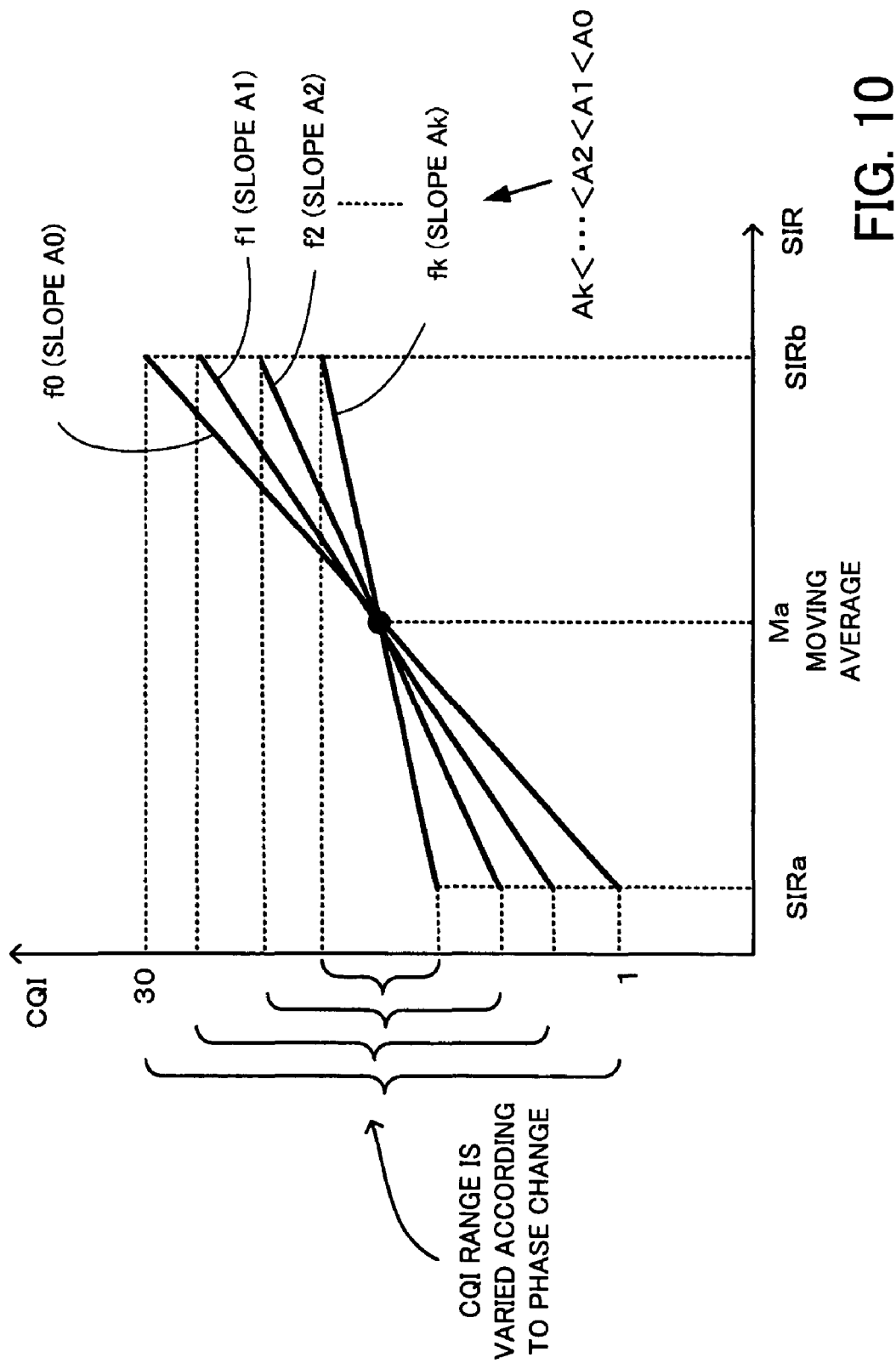
FIG. 10 illustrates the manner of setting CQI functions with different slopes in accordance with phase changes.
Figure 11:
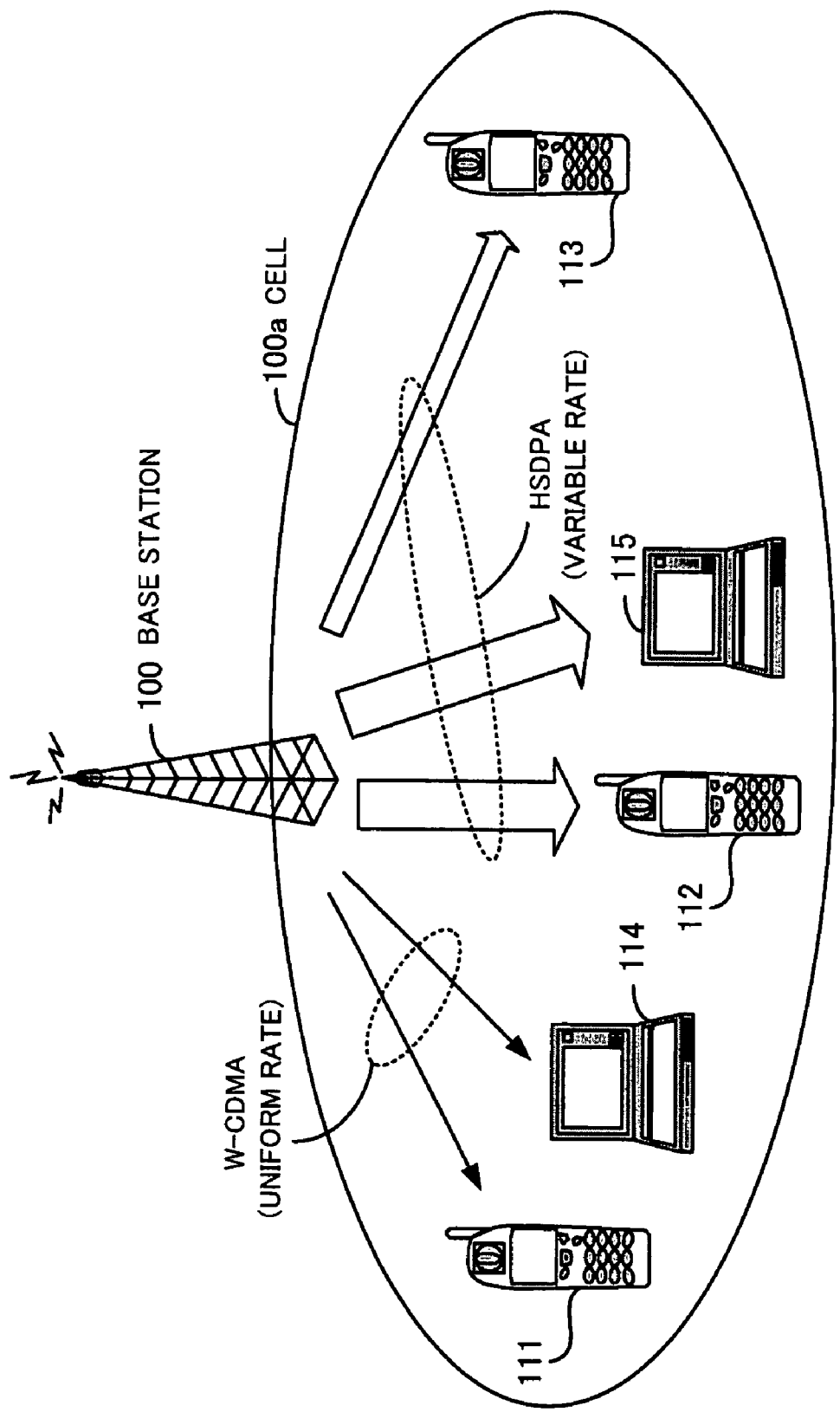
FIG. 11 illustrates an overview of HSDPA.
Figure 12:
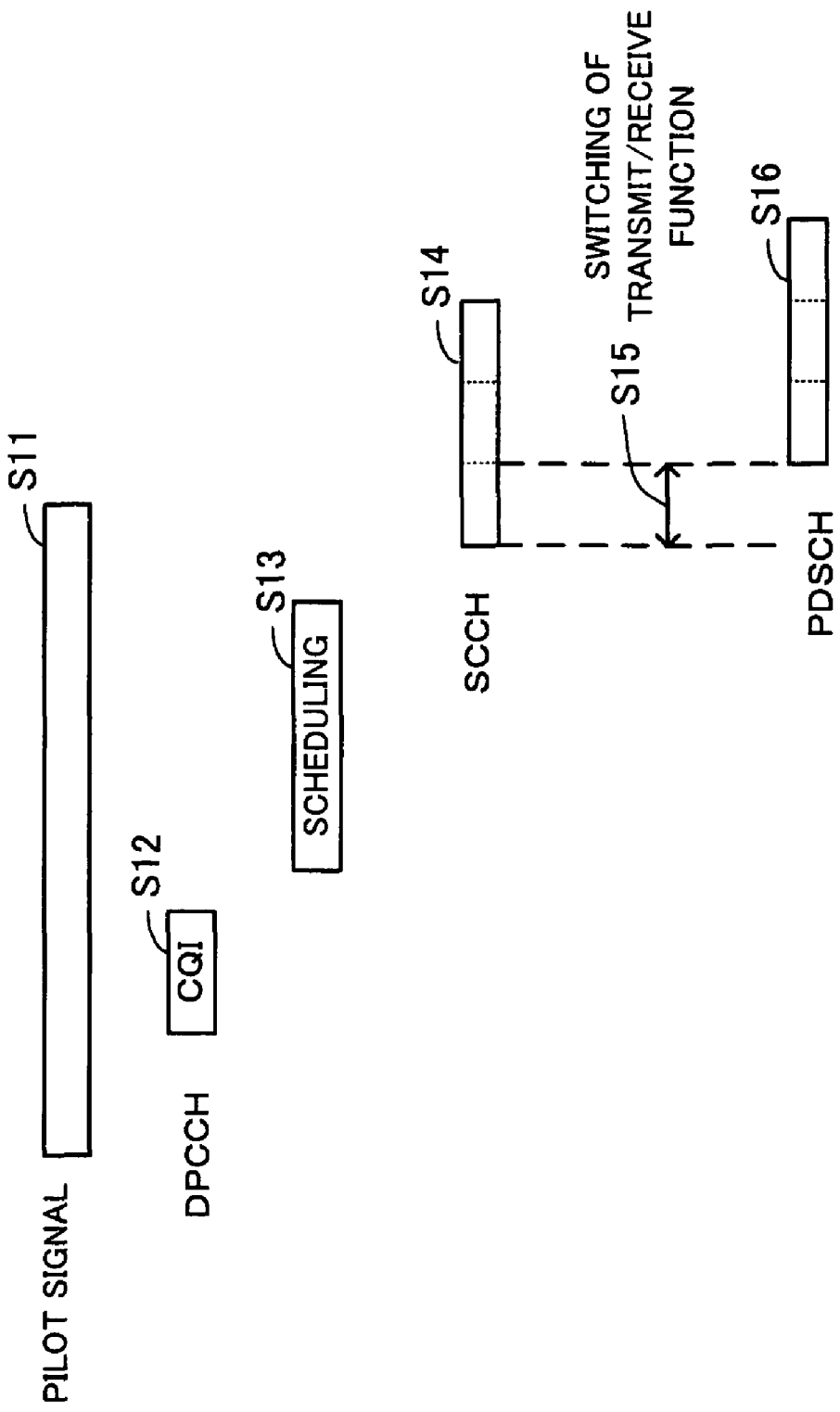
FIG. 12 illustrates a process flow from the reception of a pilot signal by a mobile terminal to the transfer of data from a base station.
Figure 13:
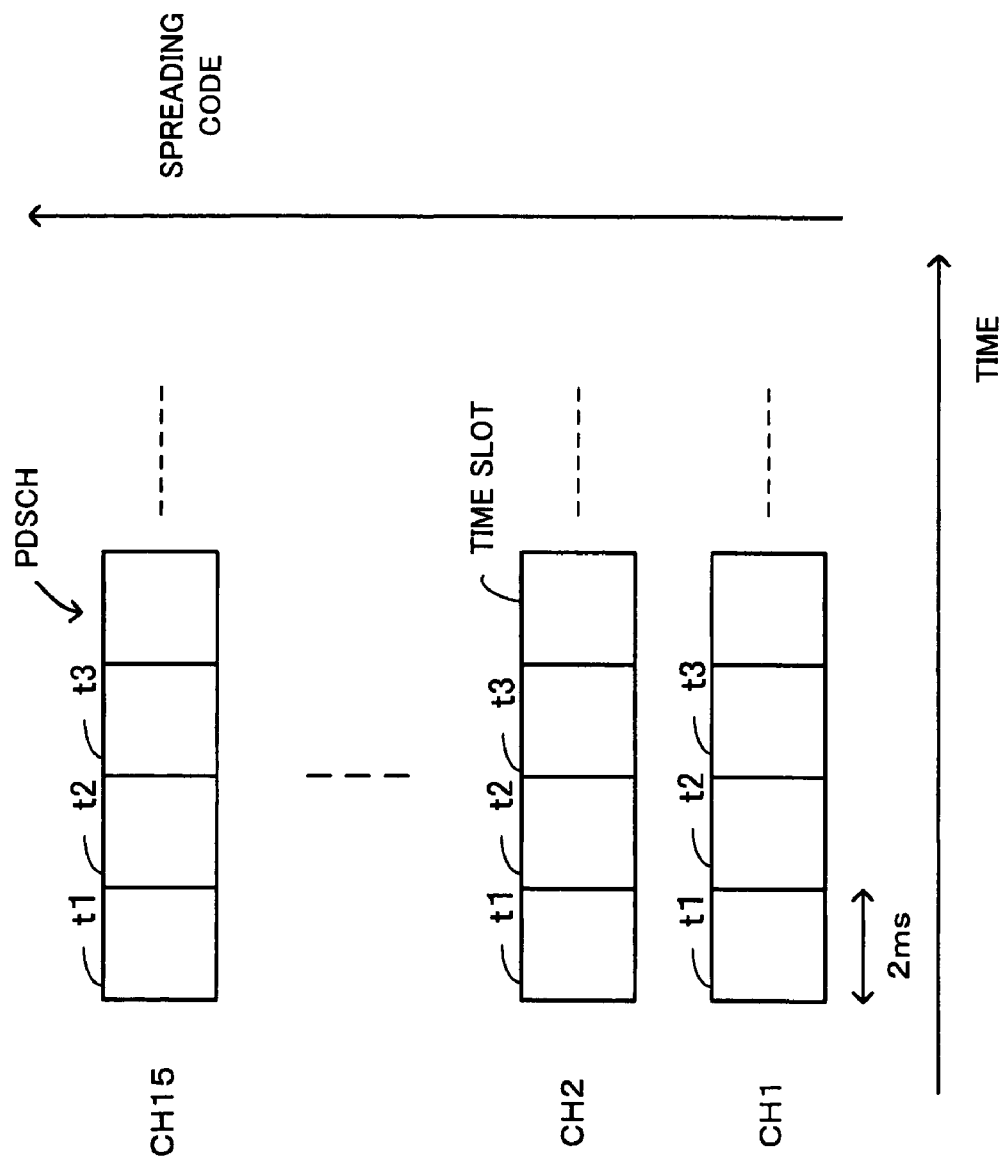
FIG. 13 illustrates allocation of PDSCH to mobile terminals.

FIG. 10 illustrates how CQI functions with respective different slopes are set in accordance with the phase change, wherein the horizontal axis indicates the SIR of the CPICH and the vertical axis indicates the CQI. When k=0 and thus the phase change θ and the threshold TH are in the relationship θ0≦TH1 (corresponding to the case where the mobile terminal remains stationary or is moving at low speeds), the slope corrector 14 does not correct the slope and sets the CQI function f0 with the original slope A0.

On the other hand, if the phase change θ is greater than the threshold TH1, it is judged that the mobile terminal is moving at high speeds, and therefore, the slope is corrected in accordance with the moving speed. Specifically, when the phase change θ and the threshold TH are in the relationship TH1<θ1≦TH2, the slope is reduced to A1 (<A0) by using the moving average Ma as the reference point, to obtain the corrected CQI function f1.

Also, when the phase change θ and the threshold TH are in the relationship TH2<θ2≦TH3, the slope is further reduced to A2 (<A1) by using the moving average Ma as the reference point, to obtain a corrected CQI function f2.

Generally, when the phase change θ and the threshold TH are in the relationship THk<θk≦TH(k+1) (1≦k≦n−1), the slope is corrected to Ak (A(n−1)< . . . <Ak< . . . A1) by using the moving average Ma as the reference point, to obtain a corrected CQI function fk. The slope corrector 14 previously holds multiple slope values to generate CQI functions corresponding to respective different amounts of phase change.

In this manner, the slope of the CQI function is adaptively set in accordance with the amount of phase change such that the greater the phase change, the gentler the slope of the CQI function becomes (as the phase change increases, the slope of the CQI function is reduced), thereby gradually narrowing the range of values that the CQI can assume.

Consequently, the slope can be flexibly corrected in fading environments, and since the SIR/CQI conversion capable of efficiently restraining the CQI dispersion is performed, lowering in the throughput can be restrained, making it possible to achieve improved throughput, compared with the conventional HSDPA.

In the wireless communication device according to the present invention, when the amount of phase change of the pilot signal is greater than a threshold, the slope of the propagation environment index function is corrected by using the moving average of propagation environment values as a reference point, to restrain dispersion of the propagation environment index, and the slope-corrected propagation environment index function is used to obtain a propagation environment index corresponding to the measured propagation environment value. Consequently, dispersion of the propagation environment index can be efficiently restrained, making it possible to improve the throughput.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication device for performing wireless communication, comprising:
a reception controller for performing a process of receiving a pilot signal transmitted from a base station and measuring a propagation environment to obtain a propagation environment value, and a process of detecting an amount of phase change of the pilot signal;
a moving average processor for obtaining a moving average of a plurality of propagation environment values successively measured by the reception controller;
a propagation environment index function setter for setting a propagation environment index function indicative of a correspondence relationship between the propagation environment value and a propagation environment index which is a quality index of the propagation environment;
a slope corrector for correcting a slope of the propagation environment index function by using the moving average as a reference point; and
a propagation environment index transmitter for obtaining a propagation environment index corresponding to the measured propagation environment value by using the propagation environment index function, and transmitting the obtained propagation environment index to the base station,
wherein the slope corrector compares the amount of phase change of the pilot signal detected by the reception controller with a threshold and, when the detected amount of phase change is judged to be greater than the threshold, corrects the slope of the propagation environment index function by using the moving average as the reference point such that dispersion of the propagation environment index is restrained, and
wherein the propagation environment index transmitter obtains the propagation environment index corresponding to the measured propagation environment value by using the propagation environment index function of which the slope has been corrected, and transmits the obtained propagation environment index to the base station.

2. The wireless communication device according to claim 1, wherein:
the reception controller measures the propagation environment values V1, V2, . . . , Vm from the pilot signal received at times t1, t2, . . . , tm, respectively, and
where a quotient of m÷q is k−1, the moving average processor calculates an average M1 of V1 to Vk, an average M2 of Vk to V(2k−1), . . . , and an average Mq of Vm−(k−1) to Vm and obtains the moving average according to (M1+M2+ . . . +Mq)/q.

3. The wireless communication device according to claim 1, wherein:
at start of operation of the wireless communication device, the propagation environment index function setter sets a propagation environment index function with a slope A0 permitting the propagation environment index to assume a value from a minimum to a maximum value thereof,
the threshold includes a plurality of thresholds TH1, TH2, . . . , THn (TH1<TH2< . . . <THn) set with respect to the amount of phase change θk (0≦k≦n−1), and
the slope corrector adaptively corrects the slope of the propagation environment index function in accordance with the amount of phase change in such a manner that:
when the amount of phase change and the threshold are in a relationship θ0≦TH1 (k=0), the slope of the propagation environment index function is not corrected and is left unchanged at A0, and
when the amount of phase change and the threshold are in a relationship THk<θk≦TH(k+1) (1≦k≦n−1), the slope of the propagation environment index function is corrected to Ak (A(n−1)< . . . <Ak< . . . <A1) by using the moving average as the reference point.

4. A method of restraining dispersion of a propagation environment index used in wireless communication, comprising:
receiving a pilot signal transmitted from a base station and measuring a propagation environment to obtain a propagation environment value;
detecting an amount of phase change of the pilot signal;
obtaining a moving average of a plurality of propagation environment values successively measured;
comparing the amount of phase change of the pilot signal with a threshold;

correcting a slope of a propagation environment index function indicative of a correspondence relationship between the propagation environment value and a propagation environment index which is a quality index of the propagation environment, by using the moving average as a reference point such that dispersion of the propagation environment index is restrained, when the amount of phase change is judged to be greater than the threshold; and obtaining a propagation environment index corresponding to the measured propagation environment value by using the propagation environment index function of which the slope has been corrected, and transmitting the obtained propagation environment index to the base station.

5. The method according to claim 4, wherein:

the propagation environment values $V1, V2, \ldots, Vm$ are measured from the pilot signal received at times $t1, t2, \ldots, tm$, respectively, and where a quotient of $m \div q$ is $k-1$, an average M1 of V1 to Vk, an average M2 of Vk to V(2k-1), ..., and an average Mq of Vm-(k-1) to Vm are calculated, and the moving average is obtained according to $(M1+M2+\ldots+Mq)/q$.

6. The method according to claim 4, wherein:

at start of operation, a propagation environment index function with a slope A0 permitting the propagation environment index to assume a value from a minimum to a maximum value thereof is set, the threshold includes a plurality of thresholds TH1, TH2, ..., THn (TH1<TH2<...<THn) set with respect to the amount of phase change $\theta k$ ($0 \leq k \leq n-1$), and the slope of the propagation environment index function is adaptively corrected in accordance with the amount of phase change in such a manner that:

when the amount of phase change and the threshold are in a relationship $\theta 0 \leq TH1$ (k=0), the slope of the propagation environment index function is not corrected and is left unchanged at A0, and when the amount of phase change and the threshold are in a relationship $THk < \theta k \leq TH(k+1)$ ($1 \leq k \leq n-1$), the slope of the propagation environment index function is corrected to Ak ($A(n-1) < \ldots < Ak < \ldots < A1$) by using the moving average as the reference point.

* * * * *